United States Patent [19]

Banas et al.

[11] Patent Number: 4,557,487
[45] Date of Patent: Dec. 10, 1985

[54] HYBRID SEAL WITH BOTH STATIC AND DYNAMIC SEAL RINGS

[76] Inventors: Robert M. Banas, 45 Mountain View Dr., Norwich, Conn. 06360; John W. Kenyon, 3 Sawgrass Rd., Apt. D12, Charleston, S.C. 29412

[21] Appl. No.: 528,905

[22] Filed: Sep. 2, 1983

[51] Int. Cl.⁴ ............................................. F16J 15/18
[52] U.S. Cl. ..................... 277/12; 277/105; 277/177; 277/188 A; 277/206 A
[58] Field of Search .............. 277/105, 106, 165, 177, 277/186, 188 R, 188 A, 206 A, 207 R, 213–215, 173, 176

[56] References Cited

U.S. PATENT DOCUMENTS

| 2,456,356 | 12/1948 | Aber | 277/177 X |
| 2,690,360 | 9/1954 | Young | 277/177 X |
| 2,747,954 | 5/1956 | Damm et al. | 277/188 A X |
| 2,783,068 | 2/1957 | Bloom et al. | 277/177 |
| 3,418,001 | 12/1968 | Rentschler et al. | 277/206 A X |
| 4,106,779 | 8/1978 | Zabcik | 277/177 X |

FOREIGN PATENT DOCUMENTS 826521  1/1960  United Kingdom ................ 277/177

Primary Examiner—Robert S. Ward
Attorney, Agent, or Firm—Robert F. Beers; Arthur A. McGill; Prithvi C. Lall

[57] ABSTRACT

A hybrid sealing member has a sleeve with an inner surface dynamic seal and an outer surface static seal. The inner surface of the sleeve utilizes a plurality of quad ring seals having sides with undulations. The outer sleeve surface has a groove that holds an O-ring seal. Backup rings can be provided for both the quad rings and the O-rings to prevent slippage of the rings.

5 Claims, 3 Drawing Figures

HYBRID SEAL WITH BOTH STATIC AND DYNAMIC SEAL RINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to sealing members and more particularly to a fluid sealing member that has both a dynamic seal and a static seal. The seals form a barrier between oil and ambient air.

2. Description of the Prior Art

In a telemotor system chevron packing was used between the housing and piston to provide a seal between oil and ambient air. When the piston was raised air was leaking into the oil chamber causing difficulties in operation. A new gland was made to replace what appeared to be a defective component. After placing the new gland into the system the leaking continued.

SUMMARY OF THE INVENTION

This continued leaking led to the present invention of a seal to be placed between a stationary housing and a moving piston. The seal is affixed to the stationary member. The seal has a sleeve which extends between the surfaces of the stationary housing and moving piston. An O-ring provides the static seal between the outer surface of the sleeve and the stationary member. A pair of quad rings provide the dynamic seal between the sleeve and piston.

DESCRIPTION OF THE PREFERRED EMBODIMENT

Figure 1:
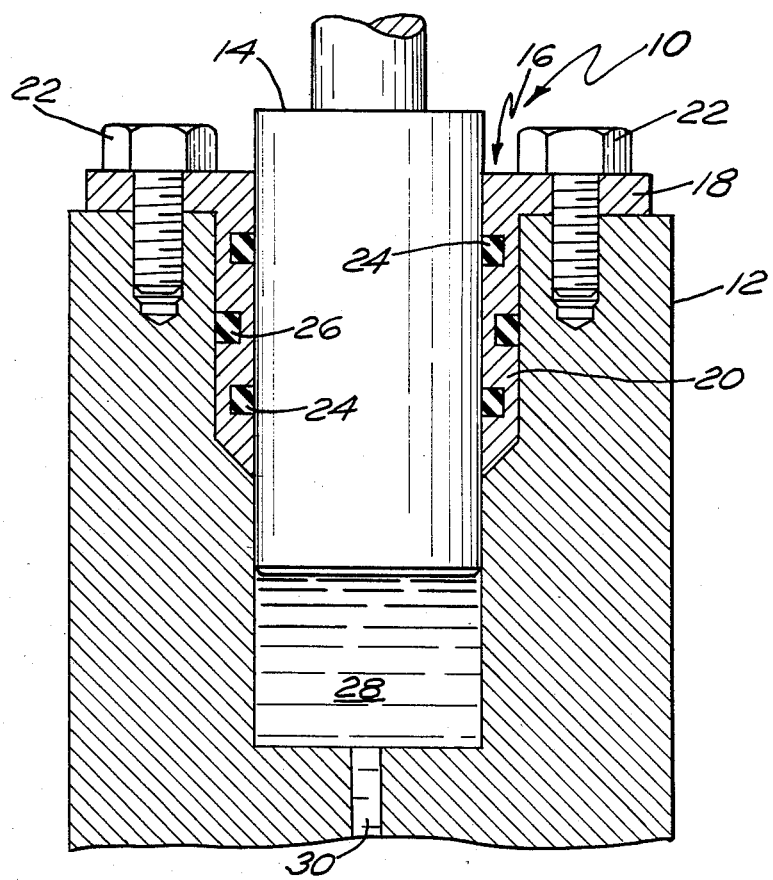
FIG. 1 is a sectional view of a hybrid seal in a hydraulic steering gear telemotor system in accordance with the present invention.

Referring now to FIG. 1 there is shown a portion of a hydraulic steering gear telemotor system 10. It includes a housing 12 having a cylindrical aperture in which a piston 14 is radially enclosed. A hybrid sealing member 16 made of brass has a flange 18 and a sleeve 20. The flange 18 is affixed to housing 12 by means of cap screws 22. The sleeve 20 is interposed between housing 12 and piston 14. The sleeve 20 has in its inner surface a pair of grooves in which quad rings 24 are inserted to provide a sliding or dynamic seal between sleeve 20 and piston 14. Sleeve 20 has in its outer surface a groove in which is inserted an O-ring 26 to form a static seal between sleeve 20 and housing 12. A cavity 28 in the housing 12 encloses oil as the working fluid. A narrow inlet or piping 30 at the bottom of cavity 28 conducts the working fluid to and from cavity 28.

Figure 2:
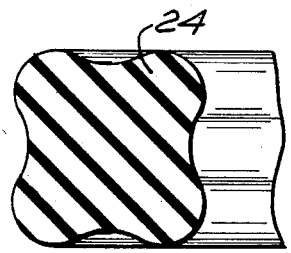
FIG. 2 is a sctional view of a quad ring of FIG. 1.

FIG. 2 shows an enlarged view of a section of quad ring 24 in its non-compressed state. The quad ring 24 has four sides and corners with each side having a concave undulation and the corners being rounded.

Figure 3:
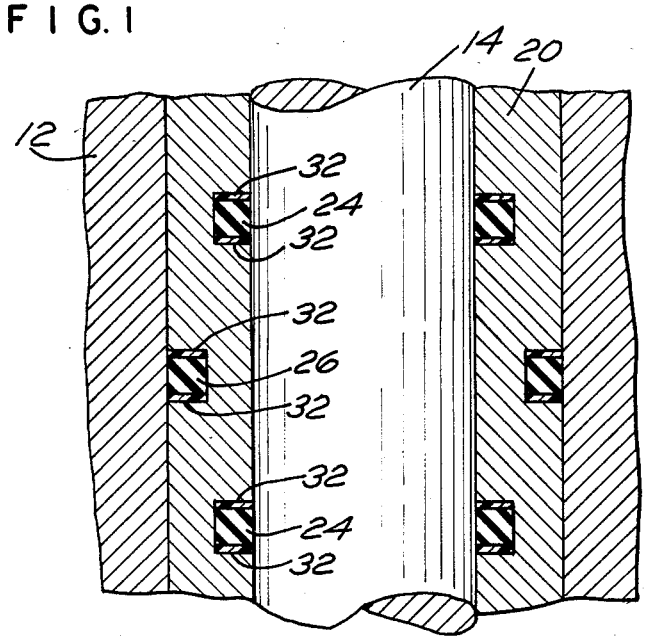
FIG. 3 is an alternate embodiment of the present invention.

FIG. 3 shows a portion of the present invention in which a polytetrafluoroethylene such as TEFLON or a material of similar characteristics is used to form backup rings 32. These backup rings 32 are used on both sides of quad rings 24 and O-ring 26 to hold the rings 24 and 26 in place by preventing slipping.

There has therefore been described a hybrid seal suitable for use in a hydraulic steering gear telemotor system in which the ambient air is prevented from leaking into an oil-filled cavity and vice versa upon operation of a piston within the system.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a telemotor system having a housing with an inner cylindrical cavity having oil as an operating fluid and a piston operating on said oil wherein the improvement comprises:

a plurality of cap screws; and a sealing ring carrier located between said housing and said piston with said sealing ring carrier having a sleeve with two inner grooves and one outer groove, said sleeve further having a flange extending radially from one end of said sleeve, said flange having a plurality of apertures through which said cap screws affix said sealing ring carrier to said housing;

a static seal O-ring inserted in said one outer groove; and two dynamic quad seal rings with sides having undulations with each of said dynamic seal rings placed respectively in each of said two inner grooves.

2. A hybrid seal adapted to be inserted between a moving component and a housing and further adapted to be affixed to said housing comprising:

a sealing ring carrier having a sleeve with a flange extending radially from one end of said sleeve, said sleeve having at least one inner and at least one outer groove, said sleeve adapted to be inserted between said moving component and said housing, said flange having means for being affixed to an outer surface of said housing;

static sealing means for providing a static seal, said static sealing means inserted in one of said at least one inner and at least one outer groove; and dynamic sealing means for providing a dynamic seal, said dynamic sealing means inserted in the other of said at least one inner and at least one outer groove.

3. A hybrid seal according to claim 2 wherein said flange extends radially outward from said one end of said sleeve.

4. A hybrid seal according to claim 2 wherein said means for being affixed to said housing comprises a plurality of apertures in said flange adapted to receive screws.

5. A hybrid seal according to claim 3 wherein said means for being affixed to said housing comprises a plurality of apertures in said flange adapted to receive screws.

* * * * *